Jan. 15, 1957

J. L. HURAULT 2,777,994

LEVEL REGULATING DEVICES FOR TRANSMISSION SYSTEMS FOR COAXIAL CABLES

Filed Nov. 14, 1951

2 Sheets-Sheet 1

INVENTOR:
JEAN LOUIS HURAULT
BY: [signature] agt

INVENTOR:
Jean Louis Hurault
BY:
Michael S. Striker
agt.

United States Patent Office
2,777,994
Patented Jan. 15, 1957

2,777,994

LEVEL REGULATING DEVICES FOR TRANSMISSION SYSTEMS FOR COAXIAL CABLES

Jean Louis Hurault, Paris, France, assignor to Compagnie Industrielle des Telephones, Paris, France, a corporation of France Application November 14, 1951, Serial No. 256,239

11 Claims. (Cl. 333—16)

The object of the present invention is a device making it possible to compensate the variations of attenuation of a coaxial cable caused by the variations of temperature.

It is well known that the attenuation A, per unit length, of a coaxial cable, varies as a function of the frequency $f$ of the current transmitted by the cable in accordance with the law:

$$A=k\sqrt{f} \quad (1)$$

$k$ being a factor which depends on the temperature.

A variation of temperature therefore produces the same effect on the attenuation of the cable as a variation of length at constant temperature.

It is therefore possible to compensate the variations of attenuation of a cable of this kind by inserting, in the intermediate amplifier stations arranged along the course of the cable, quadripoles having a composite attenuation which varies as a function of the frequency according to the aforesaid law (1), and which comprise elements manually or automatically adjustable from a control station, capable of causing the factor $k$ to vary.

In their French Patent 1,007,836 application filed on April 6, 1948, for "Regulating Device Applicable to Telecommunication Lines," the applicants have described a device of this kind in which the compensating quadripoles, which will hereinafter be called "Temperature Correctors," are inserted, in the intermediate stations between the equaliser and the amplifier, and comprise elements variable under the action of a control direct current transmitted on the cable itself from a terminal station.

The present invention relates to a method of producing these temperature correctors.

The latter are characterised in this, that they comprise at least one symmetrical shunted-T-type quadripole of which the vertical branch and the arm shunting the horizontal branch which is made up of two equal resistors, have impedances which are substantially inverse to each other, said shunt arm being made up of resistances and a certain number of inductances of which the cores are arranged in the recesses formed in a magnetizable member on which is coiled a magnetising winding fed by the control current. Actually the impedance of the vertical branch and the impedance of the arm shunting the horizontal branch are determined in such manner so that the impedance of the vertical branch multiplied by the impedance of the arm shunting the horizontal branch, will be equal to the square of one of the two resistances making up the horizontal branch. This relationship is necessary in order to fix the input impedance of the temperature corrector to that of the characteristic impedance of the line in which the temperature corrector is to be connected. When the input impedance of the corrector is equal to the characteristic impedance of the line no signal energy will be reflected.

Figure 2:
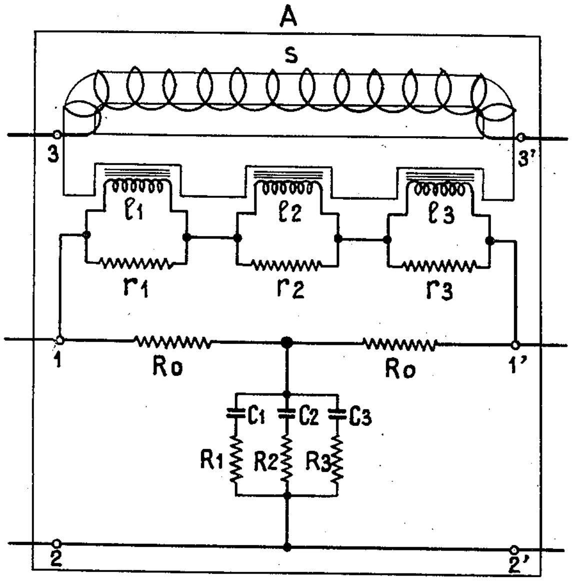
Figure 1:
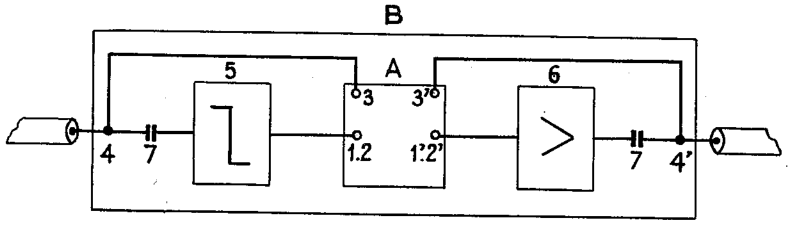
Figure 3:
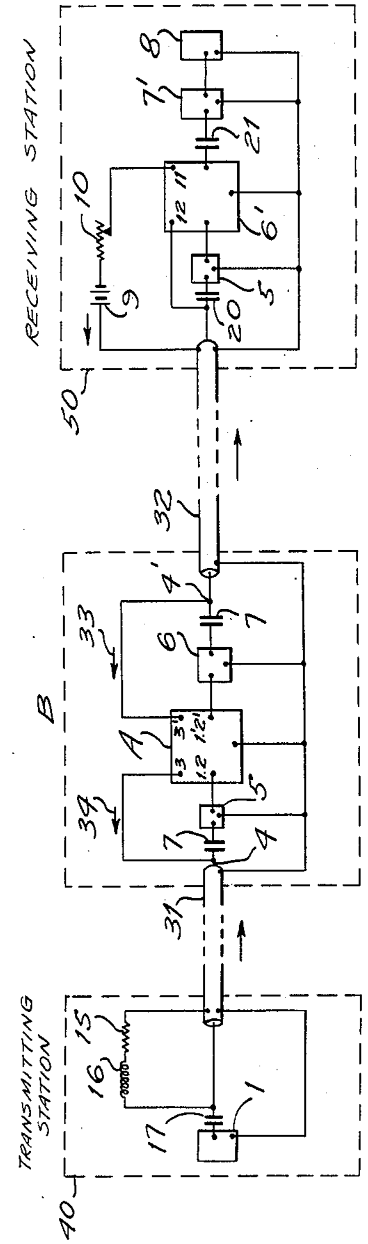

The attached drawings respectively show, by way of example: Fig. 1 the diagram of an intermediate station comprising a temperature corrector according to the invention: Fig. 2 the detailed circuit diagram of a corrector of this kind. Fig. 3 is an electrical schematic diagram of the compensating network shown in Fig. 1 connected between a transmitting and a receiving station in accordance with the principles of the present invention.

In Fig. 1, B represents the whole of the station between two sections of coaxial cables. This station comprises an equaliser 5, the temperature corrector A, and an amplifier 6. 3 and 3′ are the terminals of the control circuit of the corrector, which are respectively connected at 4, 4′ to the central conductor of each of the two sections of coaxial cable; this control circuit is fed by a direct current transmitted on the cable, and condensers 7 prevent this direct current from passing into the other members of the station.

Fig. 2 gives the circuit diagram of the corrector A of Fig. 1. This corrector is made up, as has been stated, of a T-type quadripole, of which the horizontal branch 1, 1′ comprises two equal resistances $R_0$, and the vertical branch comprises three circuits in parallel each composed of a resistance $R_1$, $R_2$, $R_3$ in series with a condenser $C_1$, $C_2$, $C_3$.

The horizontal branch 1, 1′ is shunted by an arm composed of three circuits in series each comprising a resistance $r_1$, $r_2$, $r_3$ shunted by an inductance $l_1$, $l_2$, $l_3$.

These inductances are provided with cores formed of very thin sheets.

These cores are themselves placed in recesses formed in a magnetizable member of a magnetic circuit on which is coiled a magnetising winding S, fed on its terminals 3, 3′ by the control direct current.

This device operates in the following way:

When there is a variation of the temperature of the cable, the energisation current in the winding S is caused either manually or automatically to vary; the result is a variation of the magnetising field, which causes a variation, which may be very great, of the permeability of the coils $l_1$, $l_2$, $l_3$, (it has been possible to obtain a variation in the ratio of 1 to 8) and consequently a variation in the same ratio of the inductance of said coils; this variation of inductance in turn brings about a variation of the attenuation of the quadripole, which compensates the variation of attenuation of the cable due to the change of temperature.

Thus, without the use of mechanical members, a regular, continuous and reversible variation is obtained of the attenuation due to the correcting quadripole.

By way of a numerical example, it has been found possible to obtain that in the whole frequency band comprised between 60 and 4000 kilocycles, the attenuation due to the corrector is equal according to the intensity of the control current, to that of a cable length varying between 600 and 1000 metres, the corrector therefore makes it possible to compensate variations of temperature which would correspond to variations of length of cable of 400 metres.

Of course, the number of circuits in the vertical arm and in the shunt arm, which, in the preceding example has been chosen equal to three, may be any number whatsoever.

Similarly the said arms may be made up in any way whatsoever, provided that they each only comprise the same type of reactances; it is sufficient for their impedances to be inverse to each other, at least for a certain value of the elements of the arm which comprises variable impedances, so that the characteristic impedance of the quadripole remains, under these conditions, constant at all frequencies.

As has been previously stated, a corrector can be made up of the placing in series of several shunted-T-type quadripoles, the composite attenuations of the various quadripoles then being purely and simply added, since the adaptation of the impedances is substantially achieved.

We will now give below a mathematical statement showing that the law of variation of attenuation in accordance with Formula 1 is certainly being respected when all the inductances of the shunt arm of the corrector are caused to vary in the same ratio.

Let $R_0$ be the characteristic impedance of the cell, Z the impedance of the shunt arm. That of the vertical branch of the T is, as is known, equal to $$\frac{R_0^2}{Z}$$

Therefore the product of the impedance of the cell and the impedance of the vertical branch will be equal to $R_0^2$.

The composite attenuation of the cell is given by the Formula 2.

$$A=\log_e\left|1+\frac{Z}{R_0}\right|$$

For values $\omega_1, \ldots l\omega_p$ of the inductances contained in the impedance Z, Z is a function of these impedances, and consequently a function $\phi(\omega)$ of the frequency:

$$Z=\phi(\omega)=Z(l\omega_1, l\omega_2 \ldots l\omega_p)$$

If all the inductances are reduced in the same ratio $n$, Z becomes:

$$Z'=Z\left(l_1\frac{\omega}{n}, \quad \ldots l_p\frac{\omega}{n}\right)$$
$$=\phi\left(\frac{\omega}{n}\right)$$

Thus, we see that the impedance curve is maintained while changing the scale of the frequencies; the same applied to the curve of the composite attenuation.

Let us assume $n$ to be greater than 1 and having the upper limit $n_m$; let $f_1$ and $f_2$ be the limits of the frequency band to be transmitted.

Let us assume that the attenuation between the frequencies $$\frac{f_1}{n_m}$$

and $f_2$ approximately follows the law (1) for the values $l\omega_1 \ldots l\omega_p$ of the inductances.

For any value of $n$ lower than $n_m$, the composite attenuation of the corrector $A'(f)$ at a frequency $f$ comprised between $f_1$ and $f_2$ will be equal to that of the corrector for $n=1$ at a frequency $$f'=\frac{f}{n}$$

necessarily comprised between $$\frac{f_1}{n_m}$$

and $f_2$.

Therefore:

$$A'(f)=A\left(\frac{f}{n}\right)=\frac{k}{\sqrt{n}}\sqrt{f}$$

The law of attenuation (1) is therefore preserved, and the composite attenuation of the corrector in the whole of the useful band remands equal to that of a certain length of cable.

The problem of compensation therefore reverts to the determination of a corrector of the type described, offering for a set of values of the inductances a given curve of composite attenuation between certain frequency limits. For a transmitted band of 60 to 4000 kcs., the law (1) must still be approximately kept as far as the frequencies of $$\frac{60}{8}\text{ kcs.}$$

i. e. about 7.5 kcs.

As the calculation depends on the application of Formula 2, valid on the assumption of a network with constant impedance, it is necessary to check that this approximation remains valid when the inductances are changed. In fact, for a network having the attenuation of a section from 600 to 1000 metres, the coefficient of reflection does not exceed 10%.

The strict reciprocity of the two arms is obtained for the mean value of the attenuation:

$$l_1C_1=l_2C_2=l_3C_3=r_1R_1=r_2R_2=r_3R_3=R_0^2$$

Referring now to Fig. 3 the compensating network discussed with respect to Figs. 1 and 2 is shown connected at an intermediate station between an input coaxial cable 31 and an output coaxial cable 32. The input end of the input cable 31 is connected to a transmitting station 40 and the output end of the output cable 32 is connected to a receiving station 50.

At the transmitting station 40 a transmitter 1 emits the high frequency signal which passes through the capacitor 17 and is transmitted through the center conductor of the cable 31 to the terminal 4 of the amplifier station B. This signal will pass through the capacitor 17, the equalizer 5 and the terminals 1.2 and 1'.2' of the compensating network A to the amplifier 6 where it will be amplified in conventional fashion and transmitted through the capacitor 7 to the output coaxial cable 32. The high frequency signal is then transmitted through the coaxial cable 32 to the receiving station 50 where it passes through the capacitor 20, a second equalizer 5, a second attenuation compensating network 6', a capacitor 21, an additional amplifier 7' to the receiver 8.

In the receiving station 50 is a source of direct current potential 9 which is connected in series with a rheostat 10. The current flowing from the source 9 passes through the variable rheostat 10 to the terminal 11 of the network 6'. Current flows through a magnetizable member in the network 6' which is similar to the member S of Fig. 2. This current is emitted from terminal 12 of the network 6' and applied to the center conductor of coaxial cable 32.

This direct current is then transmitted through the center conductor of the coaxial cable 32 to the terminal 4' in the amplifying station B. Since this direct current cannot pass through the capacitor 7, the current flows in the direction of the arrow 33 into the terminal 3' of the network A.

As explained hereinabove the direct current flowing through the magnetizable member S between the terminals 3 and 3' varies the saturation and magnetization of the magnetizable member S to compensate for the temperature-induced changes in attenuation. The direct current then flows out from terminal 3 in the direction of the arrow 34 to the terminal 4 from where it is transmitted along the center conductor of the coaxial cable 31 to the transmitting station 40.

At the transmitter station 40 there is provided an inductance 16 and a resistor 15 connected in series between the center conductor of the coaxial cable 31 and the outer shell thereof. It is apparent that this inductance and resistance combination provides a substantially high impedance at high frequencies so that none of the high frequency signals transmitted from the transmitter 1 will be shorted to the outer shell of the conductor 31 by the inductance 15 and 16. However, the inductance 16 provides a substantial short circuit to the direct current flowing on the center conductor of the coaxial cable 31 and accordingly provides the return path for the direct current back to the source 9 in the receiving station. Similarly, it is clear that the direct current does not flow to the transmitter in the transmitting station or to the receiver in the receiving station because of the various capacitors that are provided as explained hereinabove and which introduce an effective open circuit at direct current.

In accordance with Fig. 3 it can be seen that the amount of direct current flowing through the various compensating networks in the amplifying stations between the transmitting station 40 and the receiving station 50 may be varied by varying the position of the tap on the variable rheostat 10. As has been indicated hereinabove, this variation of the rheostat may be manually or automatically controlled. It is also clear that the amplifier station B represents only one of a plurality of amplifying stations which are normally provided between the transmitting and receiving stations 40 and 50, respectively.

What is claimed is:

1. In a signal transmission system, in combination, a transmitting station; a receiving station; a plurality of amplifier stations intermediate said transmitting and receiving stations; a coaxial transmission line interconnecting said transmitting station with said receiving station through said amplifier stations, each of said amplifier stations including therein a compensating network for correcting for attenuation changes in said transmission line comprising, in combination, a T network having a vertical branch consisting of a plurality of circuits in parallel, each of said circuits consisting of a resistance in series with a capacitor, and a horizontal branch having two equal resistances; a shunting branch shunting said horizontal branch, said shunting branch consisting of a plurality of circuits connected in series, the number of circuits in said shunting branch being equal to the number of circuits in said vertical branch of said T network, each of said circuits of said shunting branch consisting of a resistance in parallel with an inductance, the product of the impedance of the vertical branch and the impedance of said shunting branch being equal to the square of one of the resistances of said horizontal branch; a magnetizable member, said magnetizable member having recesses in which are located the inductances of said shunting branch; and means including said coaxial transmission line for transmitting a direct control current to said magnetizable member for magnetizing said magnetizable member, whereby changes in the attenuation of said transmission line may be compensated for by adjusting the direct control current supplied to said magnetizable member.

2. In a signal transmission system, in combination, a transmitting sttaion; receiving station; a plurality of amplifier stations intermediate said transmitting and receiving stations; a coaxial transmission line for transmitting signals interconnecting said transmitting station with said receiving station through said amplifier station, each of said amplifier stations including therein a compensating network for correcting for attenuation changes in said transmission line comprising, in combination, two equal main resistances included in series in one of said wires; an impedance network connected at one of its terminals to said one wire at a point between said main resistances and at its other terminal to the other wire and including at least one circuit consisting of a resistance in series with a capacitor; a shunting network shunting said main resistances and including at least one circuit consisting of a resistance in parallel with an inductance, the total impedance of said impedance network and the total impedance of said shunting network being such that the products of said impedances is equal to the square of one of said main resistances, a magnetizable member having at least one recess in which is located the inductance of said circuit of said shunting network; and means including said coaxial transmission line for transmitting to said magnetizable member a direct control current for effecting the magnetization of said magnetizable member, whereby changes in the attenuation of said transmission line may be compensated for by varying the direct control current supplied to said magnetizable member.

3. In a signal transmission system, in combination, a transmitting station; a receiving station; a plurality of amplifier stations intermediate said transmitting and receiving stations; a coaxial transmission line for transmitting signals interconnecting said transmitting station with said receiving station through said amplifier station, each of said amplifier stations including therein a compensating network for correcting for attenuation changes in said transmission line comprising, in combination, two equal main resistances included in series in one of said wires; an impedance network connected at one of its terminals to said one wire at a point between said main resistances and at the other terminal to the other wire and including at least one circuit consisting of resistance means and capacity means; a shunting network shunting said main resistances and including at least one circuit consisting of a resistance means and an inductance means, the means in one of said circuits being connected in parallel and the means in the other of said circuits being connected in series, the total impedance of said impedance network and the total impedance of said shunting network being such that the products of said impedances is equal to the square of one of said main resistances, a magnetizable member having at least one recess in which is located the inductance of said circuit of said shunting network; and means including said coaxial transmission line for transmitting to said magnetizable member a direct control current for effecting the magnetization of said magnetizable member, whereby changes in the attenuation of said transmission line may be compensated for by varying the direct control current supplied to said magnetizable member.

4. In a signal transmission system, in combination, a transmitting station; a receiving sttaion; a plurality of amplifier stations intermediate said transmitting and receiving stations; a coaxial transmission line for transmitting signals interconnecting said transmitting station with said receiving station through said amplifier station, each of said amplifier stations including therein a compensating network for correcting for attenuation changes in said transmission line comprising, in combination, two equal main resistances included in series in one of said wires; an impedance network connected at one of its terminals to said one wire at a point between said main resistances and at its other terminal to the other wire and including at least one circuit consisting of a resistance in series with a capacitor; a shunting network shunting said main resistances and including at least one circuit consisting of a resistance in parallel with an inductance; a magnetizable member having at least one recess in which is located the inductance of said circuit of said shunting network; and means including said coaxial transmission line for transmitting to said magnetizable member a direct control current for effecting the magnetization of said magnetizable member, whereby changes in the attenuation of said transmission line may be compensated for by varying the direct control current supplied to said magnetizable member.

5. In a signal transmission system, in combination, a transmitting station; a receiving station; a plurality of amplifier stations intermediate said transmitting and receiving stations; a coaxial transmission line for transmitting signals interconnecting said transmitting station with said receiving station through said amplifier station, each of said amplifier stations including therein a compensating network for correcting for attenuation changes in said transmission line comprising, in combination, a T network having a vertical branch consisting of a plurality of circuits in parallel having a predetermined impedance, and a horizontal branch having two equal resistances connected in series; a shunting branch having a predetermined impedance shunting said horizontal branch, said shunting branch consisting of a plurality of circuits connected in series, each of said circuits connected in series consisting of an inductance and resistance connected in parallel, the product of the impedance of the vertical branch and the impedance of said shunting branch being equal to the square of one of the resistances of said horizontal branch; and a magnetizable member, said magnetizable member having recesses in which are located the inductances of said shunting branch; and means including said coaxial transmission line for transmitting to said magnetizable member a direct control current for effecting the magnetization of said magnetizable member, whereby changes in the attenuation of said transmission line may be compensated for by varying the direct control current supplied to said magnetizable member.

6. In a signal transmission system, in combination, a transmitting station; a receiving station; a plurality of amplifier stations intermediate said transmitting and receiving stations; a coaxial transmission line for transmitting signals interconnecting said transmitting station with said receiving station through said amplifier station, each of said amplifier stations including therein a compensating network for correcting for attenuation changes in said transmission line comprising, in combination, a T network having a vertical branch consisting of a plurality of circuits having a predetermined impedance, and a horizontal branch having two equal resistances connected in series; a shunting branch having a predetermined impedance shunting said horizontal branch, said shunting branch consisting of a plurality of circuits, each of said circuits consisting of an inductance and resistance suitably connected to yield said predetermined impedance, the product of the impedance of the vertical branch and the impedance of said shunting branch being equal to the square of one of the resistances of said horizontal branch; a magnetizable member, said magnetizable member having recesses in which are located the inductances of said shunting branch; and means including said coaxial transmission line for transmitting to said magnetizable member a direct control current for effecting the magnetization of said magnetizable member, whereby changes in the attenuation of said transmission line may be compensated for by varying the direct control current supplied to said magnetizable member.

7. In a signal transmission system, in combination, a transmitting station; a receiving station; a plurality of amplifier stations intermediate said transmitting and receiving stations; a coaxial transmission line for transmitting signals interconnecting said transmitting station with said receiving station through said amplifier station, each of said amplifier stations including therein a compensating network for correcting for attenuation changes in said transmission line comprising, in combination, a plurality of T networks each having a vertical branch consisting of a plurality of circuits having a predetermined impedance, and a horizontal branch having two equal resistances connected in series; a shunting branch having a predetermined impedance shunting said horizontal branch, said shunting branch consisting of a plurality of circuits, each of said circuits consisting of an inductance and resistance suitably connected to yield said predetermined impedance, the product of the impedance of the vertical branch and the impedance of said shunting branch being equal to the square of one of the resistances of said horizontal branch; a magnetizable member, said magnetizable member having recesses in which are located the inductances of said shunting branch; and means including said coaxial transmission line for transmitting to said magnetizable member a direct control current for effecting the magnetization of said magnetizable member, whereby changes in the attenuation of said transmission line may be compensated for by varying the direct control current supplied to said magnetizable member.

8. In a signal transmission system, in combination, a transmitting station; a receiving station; a plurality of amplifier stations intermediate said transmitting and receiving stations; a coaxial transmission line for carrying signals interconnecting said transmitting station with said receiving station through said amplifier stations, each of said amplifier stations including therein a compensating network for correcting for attenuation changes in said transmission line comprising, in combination, a T network having a vertical branch consisting of a plurality of circuits in parallel, each of said circuits consisting of a resistance in series with a capacitor, and a horizontal branch having two equal resistances; a shunting branch shunting said horizontal branch, said shunting branch consisting of a plurality of circuits connected in series, each of said circuits of said shunting branch consisting of a resistance in parallel with an inductance, the product of the impedance of the vertical branch and the impedance of said shunting branch being equal to the square of one of the resistances of said horizontal branch; a magnetizable member, said magnetizable member having recesses in which are located the inductances of said shunting branch; and means including said coaxial transmission line for transmitting to said magnetizable member a direct control current for controlling the magnetization of said magnetizable member, whereby changes in the attenuation of said transmission line may be compensated for by varying the direct control current supplied to said magnetizable member.

9. In a signal transmission system, in combination, a transmitting station; a receiving station; a plurality of amplifier stations intermediate said transmitting and receiving stations; a coaxial transmission line for carrying signals interconnecting said transmitting station with said receiving station through said amplifier stations, each of said amplifier stations including therein a compensating network for correcting for attenuation changes in said transmission line comprising, in combination, a symmetrical quadripole having a vertical branch consisting of a plurality of circuits in parallel, each of said circuits consisting of a resistance in series with a capacitor, and a horizontal branch having two equal resistances, said vertical branch being connected at one of its terminals between said equal resistances; a shunting branch shunting said horizontal branch, said shunting branch consisting of a plurality of circuits connected in series, the number of circuits in said shunting branch being equal to the number of circuits in said vertical branch of said T network, each of said circuits of said shunting branch consisting of a resistance in parallel with an inductance, the product of the impedance of the vertical branch and the impedance of said shunting branch being equal to the square of one of the resistances of said horizontal branch; a magnetizable member, said magnetizable member having recesses in which are located the inductances of said shunting branch; and means including said coaxial transmission line for transmitting to said magnetizable member a direct control current for controlling the magnetization of said magnetizable member, whereby changes in the attenuation of said transmission line may be compensated for by varying the direct control current supplied to said magnetizable member.

10. In a signal transmission system, in combination, a transmitting station; a receiving station; a plurality of amplifier stations intermediate said transmitting and receiving stations; a coaxial transmission line for carrying signals interconnecting said transmitting station with said receiving station through said amplifier stations, each of said amplifier stations including therein a compensating network for correcting for attenuation changes in said transmission line comprising, in combination, a T network having a vertical branch consisting of a plurality of circuits in parallel, each of said circuits consisting of a resistance in series with a capacitor, and a horizontal branch having a center tapped resistance, said vertical branch being connected at one end of its terminals to said center tapped resistance of said horizontal branch;

a shunting branch shunting said horizontal branch, said shunting branch consisting of a plurality of circuits connected in series, the number of circuits in said shunting branch being equal to the number of circuits in said vertical branch of said T network, each of said circuits of said shunting branch consisting of a resistance in parallel with an inductance, the product of the impedance of the vertical branch and the impedance of said shunting branch being equal to the square of one of the resistances of said horizontal branch; a magnetizable member, said magnetizable member having recesses in which are located the inductances of said shunting branch; and means including said coaxial transmission line for transmitting to said magnetizable member a direct control current for controlling the magnetization of said magnetizable member, whereby changes in the attenuation of said transmission line may be compensated for by varying the direct control current supplied to said magnetizable member.

11. In a signal transmission system, in combination, a transmitting station; a receiving station; a plurality of amplifier stations intermediate said transmitting and receiving stations; a coaxial transmission line for transmitting signals interconnecting said transmitting station with said receiving station through said amplifier station, each of said amplifier stations including therein a compensating network for correcting for attenuation changes in said transmission line comprising, in combination, a T network having a vertical branch consisting of a plurality of circuits in parallel having a predetermined impedance, and a horizontal branch having two equal resistances connected in series; a shunting branch having a predetermined impedance shunting said horizontal branch, said shunting branch consisting of a plurailty of circuits connected in series, each of said circuits connected in series consisting of an inductance and resistance connected in parallel; and a magnetizable member said magnetizable member having recesses in which are located the inductances of said shunting branch; and means including said coaxial transmission line for transmitting to said magnetizable member a direct control current for effecting the magnetization of said magnetizable member, whereby changes in the attenuation of said transmission line may be compensated for by varying the direct control current supplied to said magnetizable member.

References Cited in the file of this patent

UNITED STATES PATENTS

| | | |
|---|---|---|
| 1,606,817 | Stevenson | Nov. 16, 1926 |
| 1,762,737 | Peterson | June 10, 1930 |
| 2,153,743 | Darlington | Apr. 11, 1939 |
| 2,238,023 | Klipsch | Apr. 8, 1941 |
| 2,304,545 | Clement | Dec. 8, 1942 |
| 2,330,216 | Hoover | Sept. 28, 1943 |
| 2,569,309 | Hepp | Sept. 25, 1951 |
| 2,650,350 | Heath | Aug. 25, 1953 |